United States Patent [19]

Brotz

[11] Patent Number: 5,073,317

[45] Date of Patent: Dec. 17, 1991

[54] LARGE SPHERE PRODUCTION METHOD AND PRODUCT

[76] Inventor: Gregory R. Brotz, P. O. Box 1322, Sheboygan, Wis. 53081

[21] Appl. No.: 384,550

[22] Filed: Jul. 24, 1989

Related U.S. Application Data

[63] Continuation-in-part of Ser. No. 947,389, Dec. 29, 1986, abandoned, which is a continuation-in-part of Ser. No. 620,688, Jun. 14, 1984, abandoned.

[51] Int. Cl.$^5$ ............... B29D 22/00; B29C 67/20; B64G 1/10
[52] U.S. Cl. ............... 264/29.1; 264/45.5; 264/154; 264/321; 244/159
[58] Field of Search ............... 264/154, 321, 15, 29.1, 264/41, 45.5; 244/159

[56] References Cited

U.S. PATENT DOCUMENTS

| | | | |
|---|---|---|---|
| 3,301,935 | 1/1967 | Stoeckhert | 264/321 |
| 3,786,134 | 1/1974 | Amagi et al. | 264/53 X |
| 4,279,632 | 7/1981 | Frosch et al. | 264/24 X |
| 4,371,454 | 2/1983 | Hisatsugu et al. | 264/29.1 X |

Primary Examiner—David A. Simmons
Assistant Examiner—Chester T. Barry
Attorney, Agent, or Firm—William Nitkin

[57] ABSTRACT

A method of creating hollow spheres and spheres produced according to such method, such method including suspending in a zero gravity environment a molten resin material mixed with a blowing agent which is caused to foam expanding into a spherical mass wherein the insides are hollowed out and the exterior sphere wall is solidified and the further process of creating adjoining spheres.

4 Claims, 3 Drawing Sheets

LARGE SPHERE PRODUCTION METHOD AND PRODUCT

This application is a continuation-in-part of my previously filed application entitled Large Sphere Production Process at Zero Gravity, Ser. No. 947,389 filed Dec. 29, 1986 now abandoned which is a continuation-in-part of my previous application entitled Sphere Production Process, Ser. No. 620,688, filed Jun. 14, 1984, now abandoned.

BACKGROUND OF THE INVENTION

1. Field of the Invention

This invention relates to sphere production techniques at zero gravity and more particularly relates to a method of producing strong lightweight, large, thin-walled carbon or other material spheres for a variety of uses.

2. History of the Prior Art

The production of materials in space in a weightless environment including the manufacture of hollow metal spheres has been appreciated and discussed in the prior art in U.S. Pat. No. 3,534,926 to H. F. Wuenscher entitled Space Manufacturing Machine. The production of hollow spheres in a normal environment has been disclosed such as in U.S. Pat. No. 4,303,603 to Torobin. The desirability of spheres in space has been appreciated in U.S. Pat. No. 4,734,021 to Maddock.

SUMMARY OF THE INVENTION

It is an object of this invention in some embodiments to manufacture in a zero gravity environment, such as in space, very large hollow spheres and other shapes which can be useful for a variety of purposes including rooms for space stations. These spheres would be strong, lightweight and can have walls of varying thicknesses.

In one embodiment such very large spheres can be created by the following method. A molten globule of carbonizable and/or graphitizable resin or equivalent mixed with a blowing agent can be ejected from a spacecraft into outer space at zero gravity where the vacuum of space will cause the blowing agent to generate gas and cause the resin to foam significantly thereby increasing its volume. In the low temperature of outer space especially if this operation were carried out in the shadow of a large celestial body, the outside surface of the expanding sphere would eventually cool, cease to expand and solidify. A corridor is then formed such as by hand by injecting heat from a heat gun from the exterior of the sphere into its center and the heat gun can then be carried into the sphere's center by an individual through the corridor created into the center of the sphere and the individual then directs the heat from the heat gun against the inside of the sphere thereby melting the inner cell walls and causing the newly molten resin forming such cell walls to flow together toward the exterior wall of the sphere. When the individual carrying the heat gun approaches the outer surface of the sphere, the process of cell wall melting and the flowing together of the melted cell wall materials due to the directed heat of the heat gun does not continue because the low temperature of outer space, especially in a shadow area, keeps the exterior of the sphere at a temperature lower than its melting point as the heat of the heat gun can be regulated so that the heat of the heat gun will not melt through the outer surface of the sphere. The sphere, after formation, can be baked at high temperatures to cause graphitization of its wall. A solar concentrator can direct and concentrate sunlight onto the revolving foamed sphere. These concentrators can be made out of metalized graphite fabric sewn onto a nitinol framework in a shape suitable to act as a reflector. The nitinol and the fabric could be folded into a capsule for putting it into orbit. Once in orbit and exposed to the sun, the nitinol would assume its original shape to produce the large reflector. The spheres could also be sent in an elliptical orbit around and closer to the hot sun for carbonization. These heat sources can also be used to fuse glass particles or metal onto the surface of the carbonized sphere. One can produce series of interconnected spheres using this process during acceleration if resin is projected from the first sphere and falls back on such first formed sphere such as by an individual carrying new globules of resin and blowing agent into the first sphere and ejecting from a side of the first created sphere by an extruder or piston injector with the extruded materials forming a connected adjoining partial sphere. This process can be repeated to produce any number of adjoining partial or complete spheres in any desired arrangement. It should be noted that these attached sphere structures can be quite large and could be utilized as living quarters in space such as part of a space station. When using an external heat source, the foamed sphere can be melted from the outside to form different shapes other than that of a sphere. Such spheres can also be manually cut in half and coated to be used as antennas. Other means of manipulating the heat guns or for cutting spheres can be used such as robots or equivalent.

These and other objects and embodiments of the invention will become clearer with reference to the following drawings and descriptions thereof.

DESCRIPTION OF THE PREFERRED EMBODIMENTS

Figure 1:
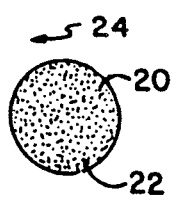
FIG. 1 illustrates a molten globule of carbonizable and/or graphitizable resin mixed with blowing agents in a zero gravity condition within a vacuum.
Figure 2:
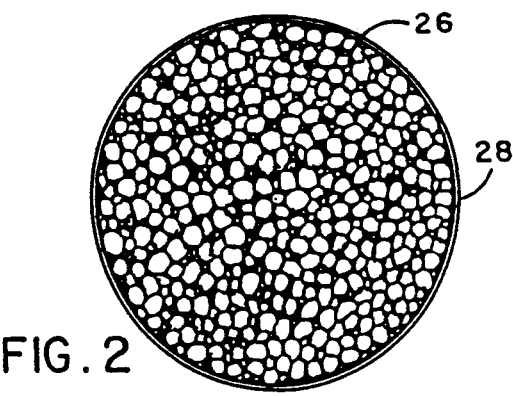
FIG. 2 illustrates the globule of FIG. 1 wherein the blowing agents have generated gas causing the resin to foam thereby increasing its volume with its outer surface cooled and solidified.
Figure 3:
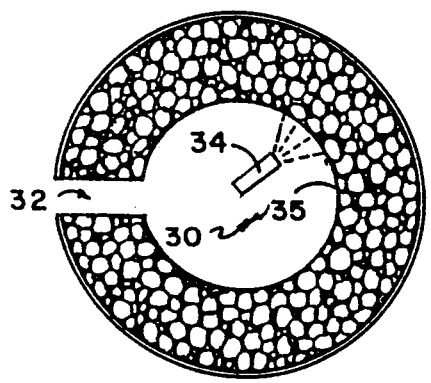
FIG. 3 illustrates the foamed resin of FIG. 2 having a corridor made into a central portion thereof with a heat gun melting the cell walls coalesce and fuse the resin forming a hollow sphere.
Figure 4:
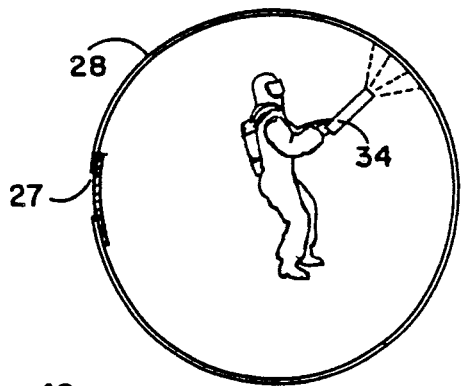
FIG. 4 illustrates the sphere of FIG. 3 with the heat gun shown approaching the outer surface of the sphere.

FIG. 1 illustrates a molten globule 20 of carbonizable and/or graphitizable resin containing a blowing agent 22 which globule is ejected into space 24 within a cool zero gravity area having a vacuum such as found in outer space. The globule stays together due to intermolecular entanglement of the resin's molecules. It should be noted that spheres produced by this process and other processes described below can be made of other equivalent materials that would yield hollow spheres by these processes. In FIG. 2 once the molten globule of material is within the vacuum of space, the blowing agent generates gas and forms a resin foam 26 substantially increasing its volume. The low temperature of space eventually causes the outside surface 28 of the expanding sphere to solidify. A corridor 32 can be made to the inside of the sphere by an individual with a heat gun 34 which is introduced into the sphere and manipulated to direct its heat against the interior 35 of the sphere which heat melts the sphere's center cell walls causing them to break and for the cell structure to retract away from the sphere's center toward its outer surface with the molten resin coalescing and fusing against the sphere's outer wall surface. When the heat gun approaches the solidified outer surface 28 as seen in FIG. 4, the melting process of the foam cannot continue because of the extremely low temperature of space. The heat level produced by the heat gun can be regulated so as not to melt through the sphere's outer surface because the outer surface of the sphere is exposed to the vacuum of space which is a very good thermal conductor and there being no external source of heat such as sunlight, the heat volume generated by the heat source, not its temperature, is insufficient to cause the melting action to penetrate the outer surface as the heat radiation from the surface of the sphere is greater than the heat of the heat source. Although the local temperature of the heat source melting the cell walls may be well above the melting temperature of the material, as the heat penetrates into the more outer regions of the sphere skin, the temperature drops because the sphere's surface radiation is greater than the heat volume from the heat source. In one embodiment to help prevent such melt-through, the sphere can be removed from the cool area of outer space and its outer surface graphitized by baking which process will form a hardened outer surface which will not be affected by the heat from the heat gun. Another method to assist in preventing melt-through is to cure the outer surface of the sphere slowly such as with an external heat such as from the sun or at faster rates of curing with other types of curing processes suitable for the material used to make the sphere. During such curing of the outer skin by heat from a light source or heat from an incandescent source either of which can be directed by large reflectors as previously described, there can be a collapsing inward of the sphere causing the diameter of the resulting sphere to be less than that of the original sphere just after blowing has stopped. If a very hot heat source is used, this inward collapsing can be held to a minimum. In some cases there may be some extra blowing initially upon remelting the outer surface and the lowering of the resin's viscosity due to the high temperature will cause the cell walls to collapse and form a non-porous skin before the thermosetting or curing of the surface occurs. During this process the vacuum of space will also help to degasify the coalescing outer cell walls. If novelac phenolic resins are used, they need a curing agent to thermoset. There are novelacs, though, which do gel and thermoset over long periods of heating, or shorter periods at higher temperature heating and this type of material is well-suited for sphere manufacture. It should be noted that if thermosetting resins are used, their melting temperature usually increases with their heat history. In some embodiments the exterior of the foamed sphere can be carbonized first before the hollowing out process is begun. The center of the sphere will be the last to cool, its heat having the longest distance to travel to the sphere's surface. Therefore when making spheres of thermosetting resins, the melting temperature of the center can be higher than that of the surface. Also a blend of solid novelac and solid resole phenolic resins can be used that has a very long heat history before it is in the cured state. The ratios of novelac to resole can be from 70% novelac-30% resole to 70% resole-30% novelac. One blowing agent which could be used therewith is N,N, Dimethyl Formamide which is soluble in the resin and has a higher boiling point than the molten resin and volatilizes easily upon reduction of pressure.

Figure 5:
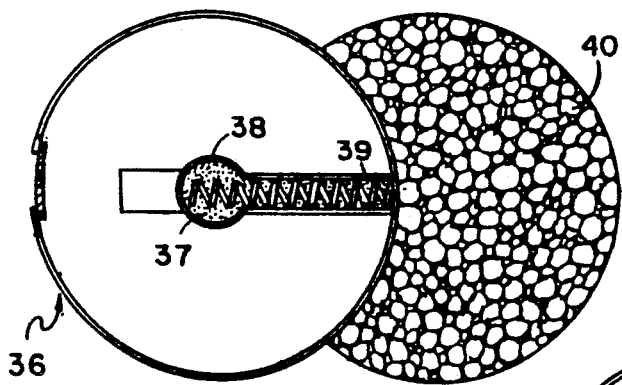
FIG. 5 illustrates the extrusion of material foamed to form an adjacent partial sphere to the first sphere.
Figure 6:
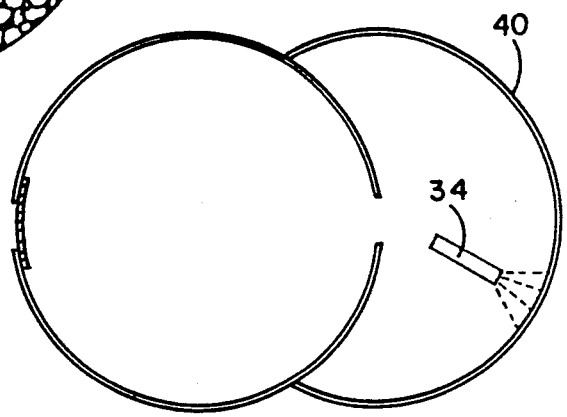
FIG. 6 illustrates a view of such adjacent sphere attached to the first sphere being hollowed out by the action of the heat gun.

In FIG. 5 a process for producing multiple adjoining spheres and partial spheres is illustrated. First sphere 36 is formed as described above having a projector 38 maneuvered therein which acts to extrude a globule of molten resin with a blowing agent through hole 39 formed in the exterior of the first sphere 36 where the resin foams and expands to form a second partial sphere 40 which is attached to and joins first sphere 36. Partial sphere 40 as seen in FIG. 6 is hollowed out by use of heat gun 34 in a similar fashion as utilized in producing the first sphere. Further spheres and partial spheres can be added by repeating the above-described process. The structure so created can be useful for a variety of purposes both in space and on the earth. In some embodiments to promote the expansion of the resin globules, heat can be applied to cause the blowing agent(s) to be more active during the initial process of the foam formation and expansion.

The weight of the resin needed for a particular sphere size and wall thickness is listed in the chart below utilizing a specific gravity of 1.2 for uncarbonized phenolic resin.

|  | Outside Diameter | Inside Diameter | Wall Thickness | Weight |
| --- | --- | --- | --- | --- |
| For 4 ft Spheres: | 48 in. | 47.5 in. | .25 in. | 77.6 lb. |
|  | 48 in. | 47 in. | .50 in. | 153.6 lb. |
|  | 48 in. | 46 in. | 1.00 in. | 300.0 lb. |
|  | 48 in. | 44 in. | 2.00 in. | 576.7 lb. |
|  | 48 in. | 40 in. | 4.00 in. | 1,057.5 lb. |
| For 10 ft Spheres: | 120 in. | 119.5 in. | .25 in. | 488.2 lb. |
|  | 120 in. | 119 in. | .50 in. | 972.4 lb. |
|  | 120 in. | 118 in. | 1.00 in. | 1,928.5 lb. |
|  | 120 in. | 116 in. | 2.00 in. | 3,792.7 lb. |
|  | 120 in. | 112 in. | 4.00 in. | 7,332.7 lb. |
| For 20 ft Spheres: | 240 in. | 239.5 in. | .25 in. | 1,956.9 lb. |
|  | 240 in. | 239 in. | .50 in. | 3,905.7 lb. |
|  | 240 in. | 238 in. | 1.00 in. | 7,778.9 lb. |
|  | 240 in. | 236 in. | 2.00 in. | 15,428.1 lb. |
|  | 240 in. | 232 in. | 4.00 in. | 30,342.0 lb. |
| For 40 ft Spheres: | 480 in. | 479.5 in. | .25 in. | 7,835.9 lb. |
|  | 480 in. | 479 in. | .50 in. | 15,655.5 lb. |
|  | 480 in. | 478 in. | 1.00 in. | 31,245.7 lb. |
|  | 480 in. | 476 in. | 2.00 in. | 62,231.1 lb. |
|  | 480 in. | 472 in. | 4.00 in. | 123,425.0 lb. |
| For 50 ft Spheres: | 600 in. | 599.5 in. | .25 in. | 12,246.1 lb. |

-continued

| Outside Diameter | Inside Diameter | Wall Thickness | Weight |
| --- | --- | --- | --- |
| 600 in. | 599 in. | .50 in. | 24,471.9 lb. |
| 600 in. | 598 in. | 1.00 in. | 48,862.2 lb. |
| 600 in. | 596 in. | 2.00 in. | 97,398.7 lb. |
| 600 in. | 592 in. | 4.00 in. | 193,498.7 lb. |

Figure 7:
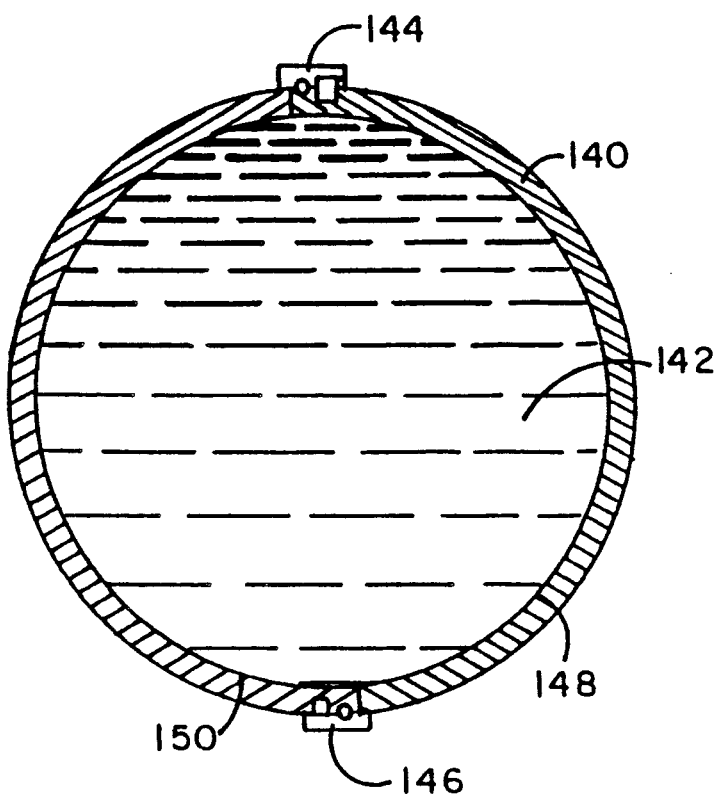
FIG. 7 is a cross-sectional view of a shell carrying molten resin for disposition in outer space.
Figure 8:
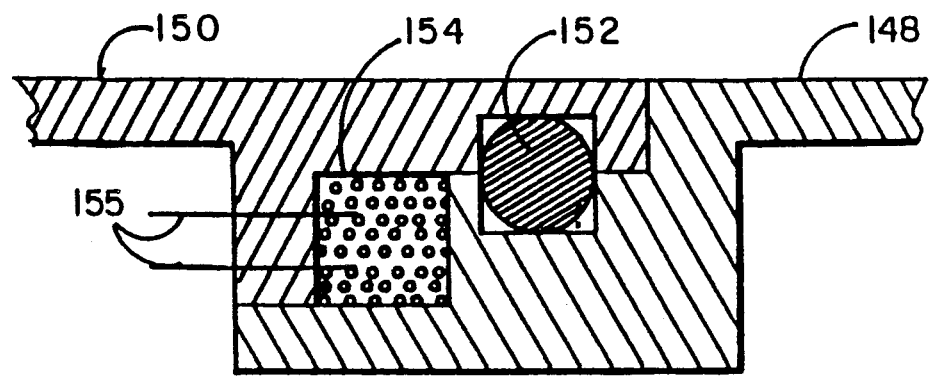
FIG. 8 is a closeup view of the separation mechanism for the shell halves as seen in FIG. 7.
Figure 9:
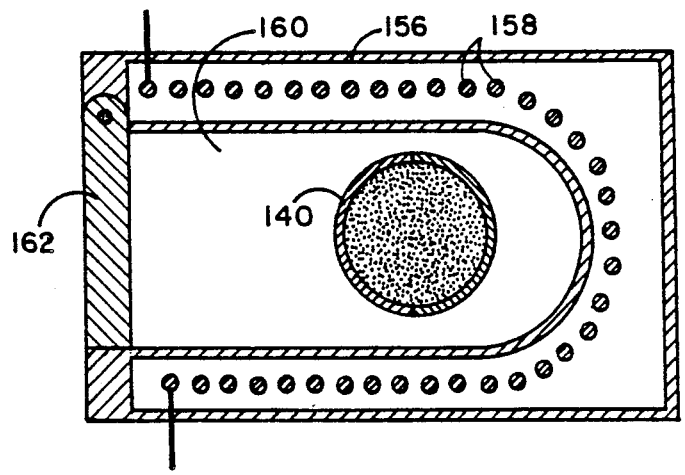
FIG. 9 is a cross-sectional view through a chamber on a spacecraft with exit means.
Figure 10:
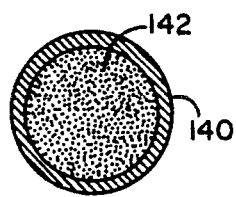
FIG. 10 illustrates the chamber of FIG. 9 with the exit means open and the sphere escaping therefrom.
Figure 11:
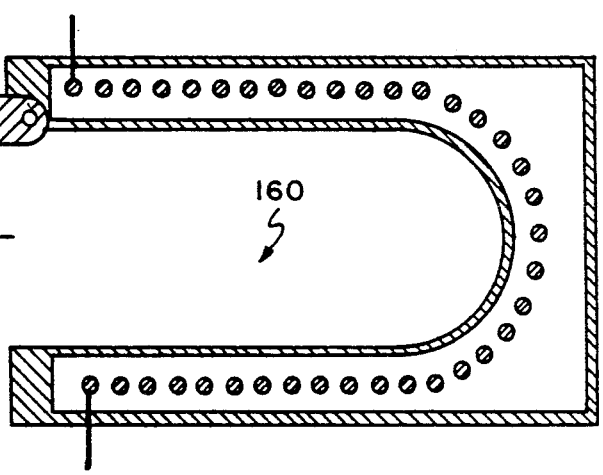
FIG. 11 illustrates the sphere of FIG. 8 having opened with the molten resin escaping therefrom.
Figure 11:
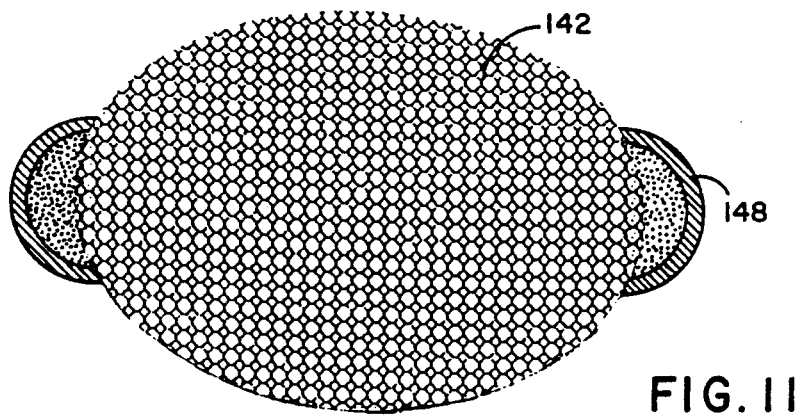

Several methods of ejecting molten resin into space for use in the formation of the spheres of this invention can be utilized. One such embodiment is illustrated in FIGS. 7-11. In FIG. 7 shell 140 can be formed of half spherical shells 150 and 148 which are joined together around a central seam and have contained therein molten resin and blowing agent 142. Confinement shell 140 can be held together at release junctions 144 and 146 which can allow for the release of the two shell halves 148 and 150 when the molten resin is to be released in space away from the spacecraft carrying the molten resin. Release junctions 144 and 146 can be of the type as illustrated in FIG. 8 wherein shell halves 148 and 150 have portions which overlap one another and have a rubber gasket 152 for sealing and an explosive charge 154 with detonation electrical leads 155 extending to the spacecraft. When the sphere is carried in the craft, it can be held within a chamber 160 such as seen in FIG. 9 surrounded by heating coils 158 within shell 156 to separate the chamber from the rest of the ship. Door 162 can be provided to outside the craft. As seen in FIG. 10, when door 162 opens confinement shell 140 is allowed to escape from chamber 160 to outer space where an electric charge through the detonation leads which extend to the ship can explode explosive charges 154 thereby blowing the shell apart at the release junctions which hold it together causing the halves of shell 148 and 150 to separate as seen in FIG. 11, releasing molten resin and blowing agent 142 to be processed as described in this invention.

Although the present invention has been described with reference to particular embodiments, it will be apparent to those skilled in the art that variations and modifications can be substituted therefor without departing from the principles and spirit of the invention.

I claim:

1. A method of creating large hollow spheres comprising the steps of:
    mixing a blowing agent with molten resin material;
    suspending said mixture in a cool zero gravity environment;
    activating said blowing agent;
    foaming said mixture into a spherical cellular structure having cell walls by action of the blowing agent with the molten resin material;
    expanding the volume of said molten resin material by said foaming;
    cooling the outside surface of said sphere in the cool environment;
    solidifying said outside surface of said sphere by said cooling;
    breaking said foam's inner cell walls by action of a heat gun melting said resin material;
    forming a hollow center in said sphere by the breaking of said foam's inner cell walls by flowing said melted inner cellular wall material outward toward the solid outside surface of said sphere;
    cooling said remaining molten resin material;
    forming an inner sphere wall having a solid surface concentrically within said solid outside surface by action of said cooling of said remaining resin molten material;
    carbonizing said sphere by baking said sphere at high temperatures;
    forming an aperture in said sphere;
    carrying more molten resin and blowing agent material into said sphere;
    projecting a globule of said molten resin material mixed with a blowing agent from inside said sphere to its outer surface through said aperture;
    foaming said mixture into a spherical cellular structure having cell walls by action of said blowing agent with said molten resin material;
    expanding the volume of said molten resin material by said foaming;
    forming an adjoining partial sphere against said already-formed sphere from said foamed material;
    cooling the outer surface of said adjoining sphere;
    solidifying said outer surface of said adjoining sphere by said cooling;
    breaking and melting said foam's inner cell walls by action of a heat gun;
    tunneling into said adjoining sphere;
    flowing said melted inner cellular wall material outward toward said adjoining sphere's outside surface by directing a heat gun thereagainst; and
    regulating said heat applied to said inside wall of said sphere to be of a temperature that will not melt through said solid outside surface of said adjoining sphere.

2. The method of claim 1 further including the step of:
    carbonizing said adjoining sphere by baking said sphere at high temperatures.

3. Spheres produced according to the method of claim 1.

4. Spheres produced according to the method of claim 2.

* * * * *